(12) United States Patent
Cheung et al.

(10) Patent No.: US 11,917,744 B2
(45) Date of Patent: Feb. 27, 2024

(54) HEAT MANAGEMENT FOR INDUCTIVELY COUPLED PLASMA SYSTEMS

(71) Applicant: PERKINELMER SCIENTIFIC CANADA ULC, Woodbridge (CA)

(72) Inventors: Tak Shun Cheung, Woodbridge (CA); Chui Ha Cindy Wong, Woodbridge (CA); William Fisher, Woodbridge (CA); Hamid Badiei, Woodbridge (CA)

(73) Assignee: PERKINELMER SCIENTIFIC CANADA ULC, Woodbridge (CA)

( * ) Notice: Subject to any disclaimer, the term of this patent is extended or adjusted under 35 U.S.C. 154(b) by 405 days.

(21) Appl. No.: 17/383,060

(22) Filed: Jul. 22, 2021

(65) Prior Publication Data

US 2023/0028640 A1 Jan. 26, 2023

(51) Int. Cl.
| | |
|---|---|
| *H05H 1/28* | (2006.01) |
| *H01J 49/10* | (2006.01) |
| *H05H 1/46* | (2006.01) |
| *H01J 49/04* | (2006.01) |
| *G01J 3/44* | (2006.01) |
| *G01J 3/443* | (2006.01) |

(52) U.S. Cl.
CPC ........... *H05H 1/28* (2013.01); *H01J 49/0468* (2013.01); *H01J 49/105* (2013.01); *H05H 1/4652* (2021.05); *G01J 3/443* (2013.01)

(58) Field of Classification Search
CPC ..... H05H 1/28; H05H 1/4652; H01J 49/0468; H01J 49/105; G01J 3/443
USPC ................................ 250/281, 282, 283, 288
See application file for complete search history.

(56) References Cited

U.S. PATENT DOCUMENTS

| | | | |
|---|---|---|---|
| 6,392,313 B1* | 5/2002 | Epstein | F01K 13/00 310/40 MM |
| 2018/0330933 A1 | 11/2018 | Chan et al. | |
| 2019/0009211 A1* | 1/2019 | Farhang | B01D 53/82 |
| 2023/0077051 A1* | 3/2023 | Yopps | C22B 3/44 |

* cited by examiner

*Primary Examiner* — Nicole M Ippolito
(74) *Attorney, Agent, or Firm* — Myers Bigel, P.A.

(57) ABSTRACT

A system for cooling an inductively coupled plasma (ICP) instrument includes: the ICP instrument; a pump in fluid communication with the instrument via a first conduit; and a micro-channel heat exchanger in fluid communication with the instrument via a second conduit, and in fluid communication with the pump via a third conduit. The pump is configured to generate a pump outlet pressure of coolant that exceeds a back pressure of the instrument such that a pressure of the coolant traveling through the second conduit and into the heat exchanger is less than or equal to 5 pounds per square inch (psi) above atmospheric pressure, as measured at an inlet to the heat exchanger.

26 Claims, 11 Drawing Sheets

HEAT MANAGEMENT FOR INDUCTIVELY COUPLED PLASMA SYSTEMS

BACKGROUND

Inductively Coupled Plasma (ICP) instruments such as ICP-mass spectrometry (ICP-MS) instruments utilize a hot plasma to dissolvate, vaporize, and ionize chemical samples for qualification and quantification testing. The heat dissipation to the instrument needs to be removed by cooling using a heat exchanger.

One current solution is a chiller with a refrigeration compressor and a condenser. Thick copper tubing is used to withstand high pressure coolant. A high-power (water) pump is used and has high heat dissipation. The system is very bulky and highly inefficient because the refrigeration compressor and water pump themselves generate a lot of heat and are also required to be cooled down. The system generates a lot of heat to the facility such as the lab in which the instrument is situated.

Another existing solution uses a re-circulator. The system does not use a refrigeration compressor and has less cooling power than the chiller solution. Thick copper tubing is used to withstand high pressure coolant. A high-power pump (with excessive heat dissipation) is used to push coolant with high pressure (e.g., greater than 50 psi). This system is also very bulky and generates considerable heat to the lab. Re-circulators are not typically used today because the cooling capacity is not sufficient for current ICP-MS instruments on the market.

SUMMARY

Some embodiments of the present technology are directed to a system for cooling an inductively coupled plasma (ICP) instrument. The system includes: the ICP instrument; a pump in fluid communication with the instrument via a first conduit; and a micro-channel heat exchanger in fluid communication with the instrument via a second conduit, and in fluid communication with the pump via a third conduit. The pump is configured to generate a pump outlet pressure of coolant that exceeds a back pressure of the instrument such that a pressure of the coolant traveling through the second conduit and into the heat exchanger is less than or equal to 5 pounds per square inch (psi) above atmospheric pressure, as measured at an inlet to the heat exchanger.

In some embodiments, the system includes: a fan configured to blow air for air cooling of the heat exchanger; and a controller operatively associated with the pump and/or the fan. The controller may be configured to control or modulate operation of the pump and/or the fan to stabilize an internal temperature of the instrument and/or to stabilize a temperature of the coolant exiting the instrument. The system may further include at least one temperature sensor in the second conduit and/or in the third conduit, with the at least one temperature sensor configured to provide feedback to the controller.

In some embodiments, the system further includes an exhaust vent configured to provide air suction for air cooling of the heat exchanger. The system may further include a controller operatively associated with the pump, with the controller configured to control or modulate operation of the pump to stabilize an internal temperature of the instrument and/or to stabilize a temperature of the coolant exiting the instrument. The system may further include at least one temperature sensor in the second conduit and/or in the third conduit, with the at least one temperature sensor configured to provide feedback to the controller. The exhaust vent may be adjustable such that an outlet of the exhaust vent can be selectively positioned to provide heated air to a room in which the system is positioned or to vent heated air to outside the room.

In some embodiments, the system further includes a housing, with the instrument, the pump, the heat exchanger, the first conduit, the second conduit, and the third conduit all held in the housing.

In some embodiments, the system further includes a housing, with the pump, the heat exchanger, at least a portion of the first conduit, at least a portion of the second conduit, and the third conduit held in the housing, and the instrument is outside the housing and optionally on the housing.

In some embodiments, the pump has a power consumption of 180 watts or less.

In some embodiments, the pump is configured to generate the pump outlet pressure of the coolant such that the coolant traveling through the second conduit and into the heat exchanger is less than or equal to atmospheric pressure, as measured at the inlet to the heat exchanger.

In some embodiments, the ICP instrument is an ICP-mass spectrometry (ICP-MS) or ICP-optical emission spectrometry (ICP-OES) instrument.

In some embodiments, the ICP instrument includes an RF load coil that is not cooled by contact with the coolant.

In some embodiments, the ICP instrument includes an RF load coil that is air cooled.

Some other embodiments of the present technology are directed to a method for cooling an inductively coupled plasma (ICP) instrument. The method includes: pumping coolant through a first conduit from a pump to the ICP instrument to heat the coolant; flowing the heated coolant through a second conduit to a micro-channel heat exchanger to cool the coolant; and flowing the cooled coolant through a third conduit to the pump. An outlet pressure of the pump exceeds a back pressure of the instrument such that a pressure of the heated coolant flowing through the second conduit to the micro-channel heat exchanger is less than or equal to 5 psi above atmospheric pressure, as measured at an inlet to the heat exchanger.

In some embodiments, the method further includes: sensing a first temperature of the heated coolant in the second conduit and/or sensing a second temperature of the cooled coolant in the third conduit; and controlling or modulating operation of the pump based on the sensed first temperature and/or second temperature to stabilize an internal temperature of the instrument and/or to stabilize a temperature of the coolant exiting the instrument.

In some embodiments, the method further includes: sensing a first temperature of the heated coolant in the second conduit and/or sensing a second temperature of the cooled coolant in the third conduit; and controlling or modulating operation of the pump based on the sensed first temperature and/or second temperature to accelerate a warmup period of the instrument.

In some embodiments, the method further includes blowing air toward and/or through the heat exchanger using a fan. The method may further include: sensing a first temperature of the heated coolant in the second conduit and/or sensing a second temperature of the cooled coolant in the third conduit; and controlling or modulating operation of the pump and/or the fan based on the sensed first temperature and/or second temperature to stabilize an internal temperature of the instrument and/or to stabilize a temperature of the coolant exiting the instrument. The method may further include: sensing a first temperature of the heated coolant in the second conduit and/or sensing a second temperature of the cooled coolant in the third conduit; and controlling or modulating operation of the pump and/or the fan based on the sensed first temperature and/or second temperature to accelerate a warmup period of the instrument.

In some embodiments, the method further includes exhausting heated air from the heat exchanger using an exhaust vent. The method may further include: sensing a first temperature of the heated coolant in the second conduit and/or sensing a second temperature of the cooled coolant in the third conduit; and controlling or modulating operation of the pump and/or an optional second pump associated with the exhaust vent based on the sensed first temperature and/or second temperature to stabilize an internal temperature of the instrument and/or to stabilize a temperature of the coolant exiting the instrument. The method may further include: sensing a first temperature of the heated coolant in the second conduit and/or sensing a second temperature of the cooled coolant in the third conduit; and controlling or modulating operation of the pump and/or an optional second pump associated with the exhaust vent based on the sensed first temperature and/or second temperature to accelerate a warmup period of the instrument. The method may further include selectively routing the heated air to a room in which the instrument is located to heat the room or to outside the room.

In some embodiments, the outlet pressure of the pump exceeds the back pressure of the instrument such that the pressure of the heated coolant flowing through the second conduit to the micro-channel heat exchanger is less than or equal to atmospheric pressure.

Some other embodiments of the present technology are directed to a cooling system for an inductively coupled plasma ICP instrument. The system includes: a pump in fluid communication with the instrument via a first conduit; and a micro-channel heat exchanger in fluid communication with the instrument via a second conduit, and in fluid communication with the pump via a third conduit. The pump is configured to generate a pump outlet pressure of coolant that exceeds a back pressure of the instrument such that a pressure of the coolant traveling through the second conduit and into the heat exchanger is less than or equal to 5 psi above atmospheric pressure, as measured at an inlet to the heat exchanger.

Further features, advantages and details of the present technology will be appreciated by those of ordinary skill in the art from a reading of the figures and the detailed description of the embodiments that follow, such description being merely illustrative of the present technology.

DETAILED DESCRIPTION

The inventors have recognized and appreciated that conventional cooling systems for ICP instruments are bulky, inefficient and generate large amounts of heat in the operating environment of the ICP instruments. The inventors have further recognized and appreciated that a micro-channel heat exchanger may be used to cool an ICP instrument if the water used to cool the ICP instrument is kept at a low pressure relative to conventional solutions (e.g., less than 30 psi). Cooling ICP instruments using micro-channel heat exchangers in accordance with some embodiments described herein may have a number of advantages that include, but are not limited to, ultra-low cost of manufacture and upkeep, highly efficient cooling, and a compact physical footprint.

Figure 1:
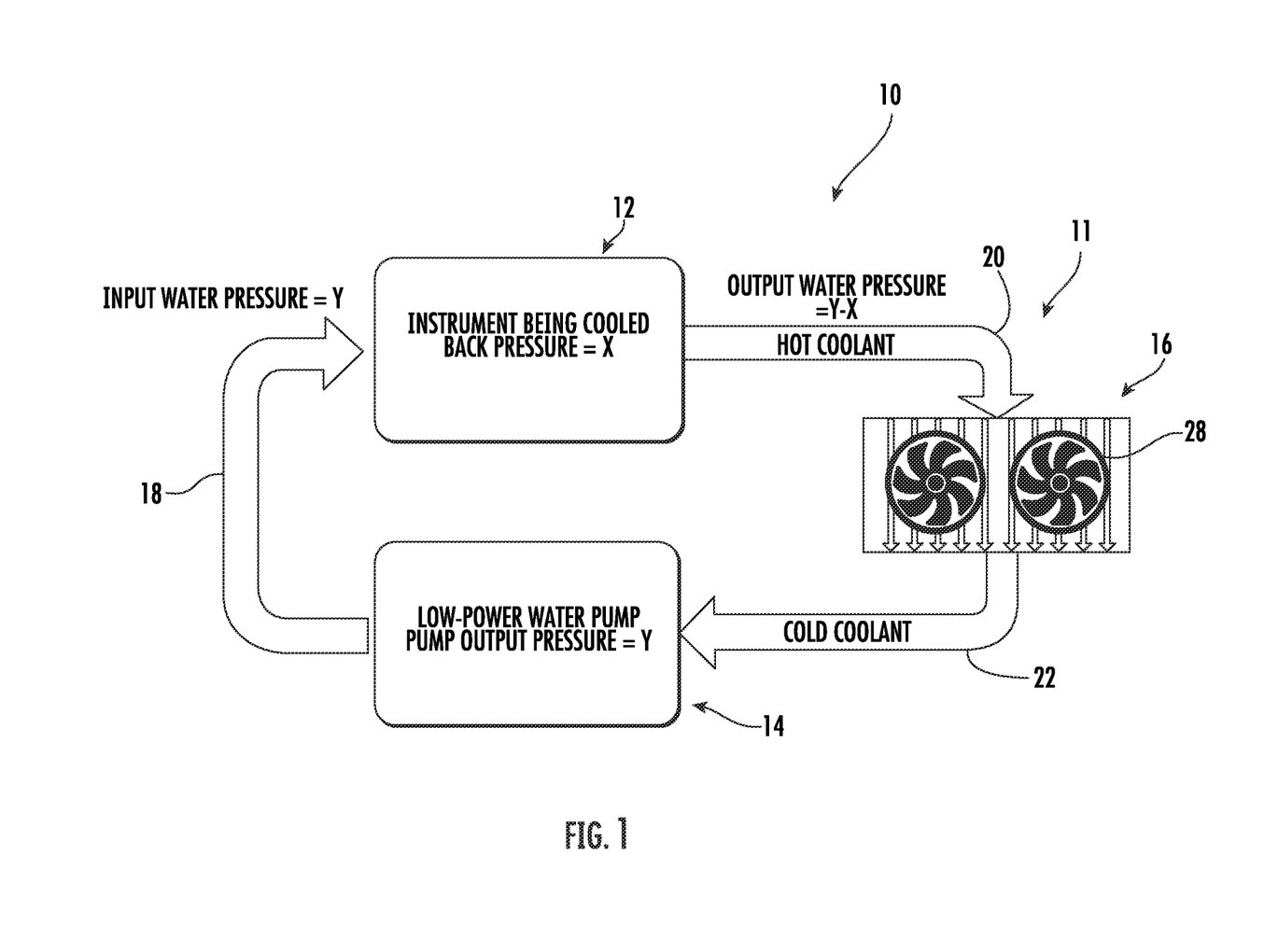
FIG. 1 is a schematic diagram of a system for cooling an inductively coupled plasma (ICP) instrument according to some embodiments.

FIG. 1 is a schematic diagram of a system 10 for cooling an ICP instrument. The system 10 includes a cooling system 11 and an ICP instrument 12. In some embodiments, the ICP instrument is an ICP-mass spectrometry (ICP-MS) or ICP-optical emission spectrometry (ICP-OES) instrument. In some embodiments, the ICP instrument 12 is an instrument that uses ICP to perform, for example, atomic emission spectroscopy or reactive ion etching.

The cooling system 11 for the ICP instrument 12 includes a pump 14 and a heat exchanger 16. The cooling system 11 may further include a first conduit 18 that fluidly connects the pump 14 and the instrument 12, a second conduit 20 that fluidly connects the instrument 12 and the heat exchanger 16, and a third conduit 22 that fluidly connects the heat exchanger 16 and the pump 14. The pump 14 may be in fluid communication with the instrument 12 via the first conduit 18. The heat exchanger 16 may be in fluid communication with the instrument 12 via the second conduit 20, and the heat exchanger 16 may be in fluid communication with the pump 14 via the third conduit 22. As used herein, "conduit" may be or include a pipe, tube, hose, or the like that is used to convey fluids such as liquid coolant.

Coolant such as water-based coolant is used to cool the instrument 12. The pump 14 may be configured to generate a pump outlet pressure that exceeds a back pressure of the instrument 12 such that a pressure of the coolant flowing through the second conduit 20 and into the heat exchanger 16 is less than or equal to 5 psi above atmospheric pressure, as measured at the inlet to the heat exchanger. In some other embodiments, the pump outlet pressure is substantially equal to the back pressure of the instrument such that the pressure of the coolant exiting the instrument is less than or equal to atmospheric pressure (14.7 psi).

The low water pressure output from the instrument 12 enables the use of a fragile, thin-walled, micro-channel heat exchanger that has a high heat exchange efficiency. The micro-channel heat exchanger is not able to withstand high coolant pressures previously employed in ICP instruments.

Figure 2:
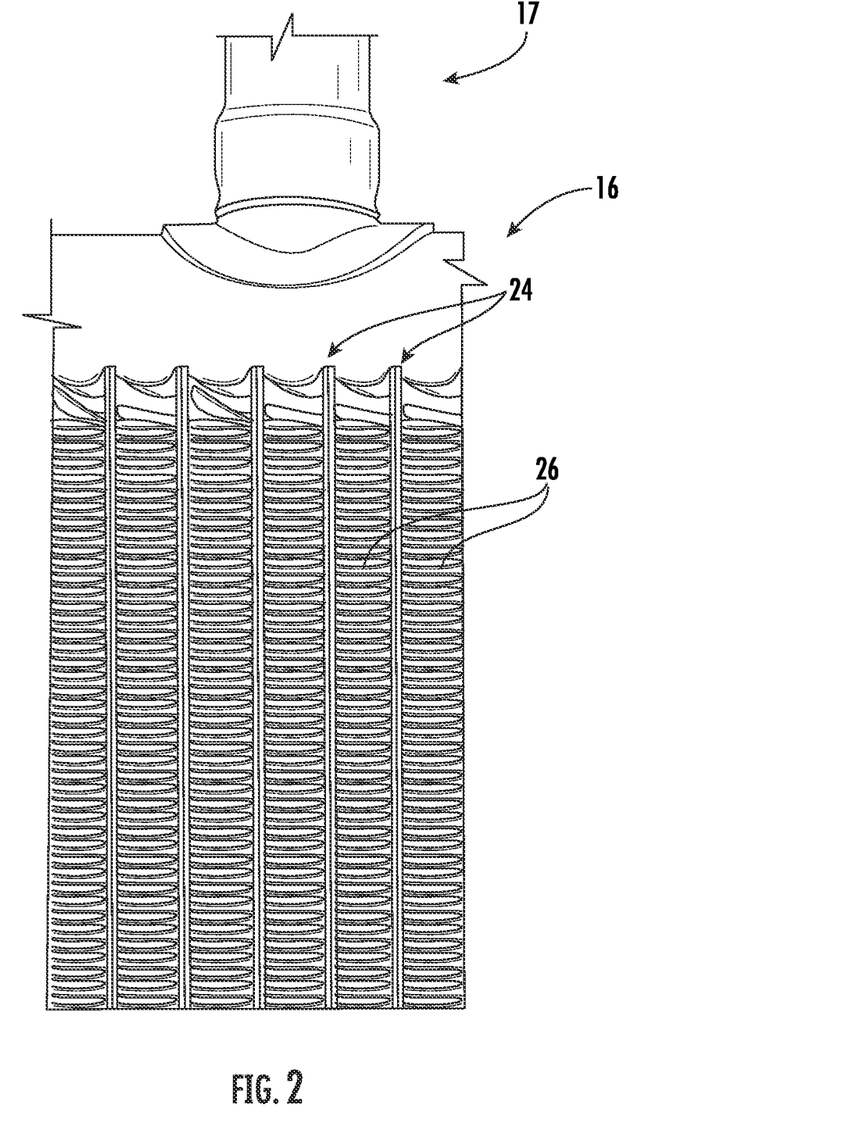
FIG. 2 is an enlarged, fragmented, view of a micro-channel heat exchanger of the system of FIG. 1.

An example of the micro-channel heat exchanger 16 is illustrated in FIG. 2. The heat exchanger 16 includes an inlet 17 and a plurality of thin-walled channels 24 that are separated by fins 26. The parallel channels 24 allow for liquid coolant flow to enable efficient heat transfer with near zero back pressure. This allows for the pump 14 to be a small, low-power water pump that has minimal self-heating effect.

The thin-walled channels 24 of the heat exchanger 16 cannot withstand high water pressure. Micro-channel heat exchangers are used in, for example, automotive applications where the car coolant is not pressurized (i.e., open to atmosphere). The present inventors have discovered that the micro-channel heat exchanger can be used for ICP-MS plasma cooling by matching or substantially matching the water pump output pressure to cancel the back pressure of the instrument under cooling so that the water pressure is low to avoid breaking or degrading the micro-channel heat exchanger.

The pump 14 may have a water output pressure that is substantially equal (i.e., barely exceeds) the back pressure (or flow resistance) of the ICP instrument and a coolant flow rate requirement such that the pump outlet pressure minus the instrument back pressure is less than or equal to 5 psi above atmospheric pressure (14.7 psi), as measured at the inlet of the heat exchanger. In this way, the following high-efficiency, compact components can be used: 1) a micro-channel heat exchanger (with parallel micro-channels and low back pressure); and 2) a low power (e.g., 140 watt), low-heat dissipation water pump, to meet the typical cooling requirement of a coolant flow rate of greater than or equal to 4 L/min.

The cooling solutions according to some embodiments may have a lower power dissipation than other cooling solutions for ICP instruments. A typical chiller cooling solution for ICP-MS consumes 2.5 to 3.5 kW. Some previously used re-circulating cooling solutions for ICP-MS consumed 840 W to 1140 W. The re-circulating cooling solutions do not have refrigeration capability and hence use less power. In contrast to these other existing cooling solutions, the cooling solutions according to some embodiments may consume less than 200 W: 100 W pump and an optional 80 W fan. As described in more detail below, the fan can be eliminated if the facility provides air cooling with exhaust venting in the building or laboratory. In some embodiments, the pump has a power consumption of 180 watts or less.

Referring again to FIG. 1, in some embodiments, the system 10 includes a fan 28 configured to blow air for air cooling of the heat exchanger.

Figure 3:
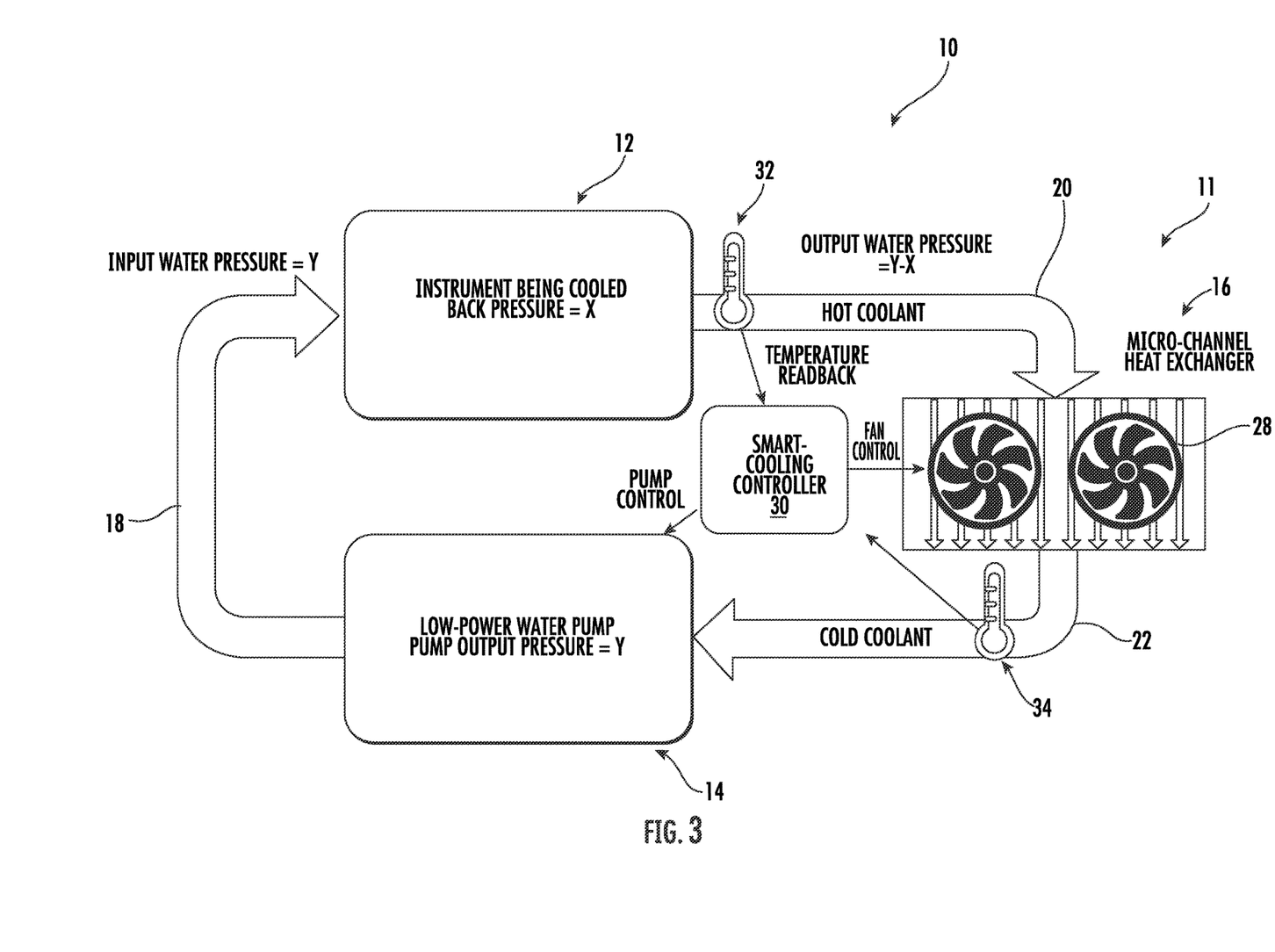
FIG. 3 is a schematic diagram of a system for cooling an ICP instrument according to some other embodiments.

Referring to FIG. 3, in some embodiments, the system 10 includes a controller 30 operatively associated with the pump 14 and/or the fan 28. A first temperature sensor 32 may be in the second conduit 20 (e.g., adjacent an outlet of the instrument) and/or a second temperature sensor 34 may be in the third conduit 22 (e.g., adjacent an outlet of the heat exchanger 16). The temperature sensor(s) 32, 34 may provide feedback (e.g., temperature data) to the controller 30.

Based on the data from the temperature sensor(s) 32, 34, the controller 30 may operate or modulate the pump 14 and/or the fan 28 to provide "smart cooling." When a cold instrument is first turned on, the controller 30 may not turn on (or may not fully turn on) the pump 14 and/or the fan 28 to accelerate the warmup period of the instrument 12. It is desirable for the system to warm up quickly to what will eventually be its equilibrium temperature (operating temperature). For example, the flow rate of the coolant or the fan speed can be adjusted to adjust the cooling rate. By doing this, the cooling is initially slow (to let the instrument warm up) and then the cooling rate is increased over time as it comes to the equilibrium temperature.

In addition, the controller 30 may adjust the pump 14 and/or the fan 28 to stabilize the internal temperature of the instrument 12 during operation. Further, the controller 30 may adjust the pump 14 and/or the fan 28 to stabilize the instrument output coolant temperature.

In some embodiments, the controller 30 automatically and programmatically adjusts the pump 14 and/or the fan 28. Here, the term "automatically" means the operation is substantially, and may be entirely, carried out without human or manual input, and can be programmatically directed or carried out. The term "programmatically" refers to operations directed and/or primarily carried out electronically by computer program modules, code, and/or instructions.

Figure 4:
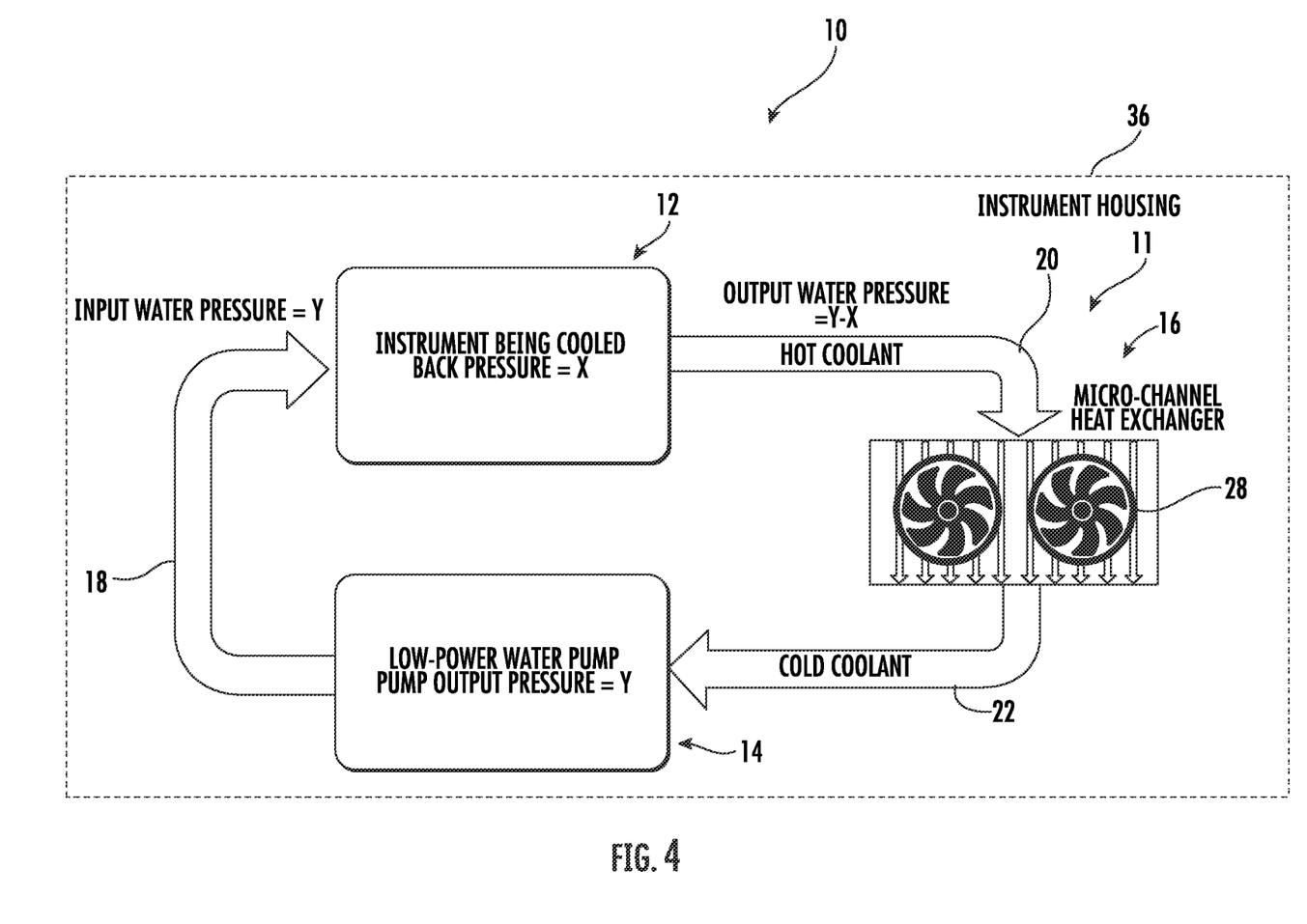
FIG. 4 is a schematic diagram of a system for cooling an ICP instrument according to some other embodiments.

Referring to FIG. 4, in some embodiments, the system 10 includes a (instrument) housing 36 that houses the entire system 10 (e.g., the instrument 12 and the cooling system 11). The enclosed cooling system 11 may include the fan 28 or a fan may be omitted and heat evacuated by a vent as described in more detail herein. Also, the enclosed cooling system 11 may include the "smart cooling" features described above with reference to FIG. 3.

Figure 5:
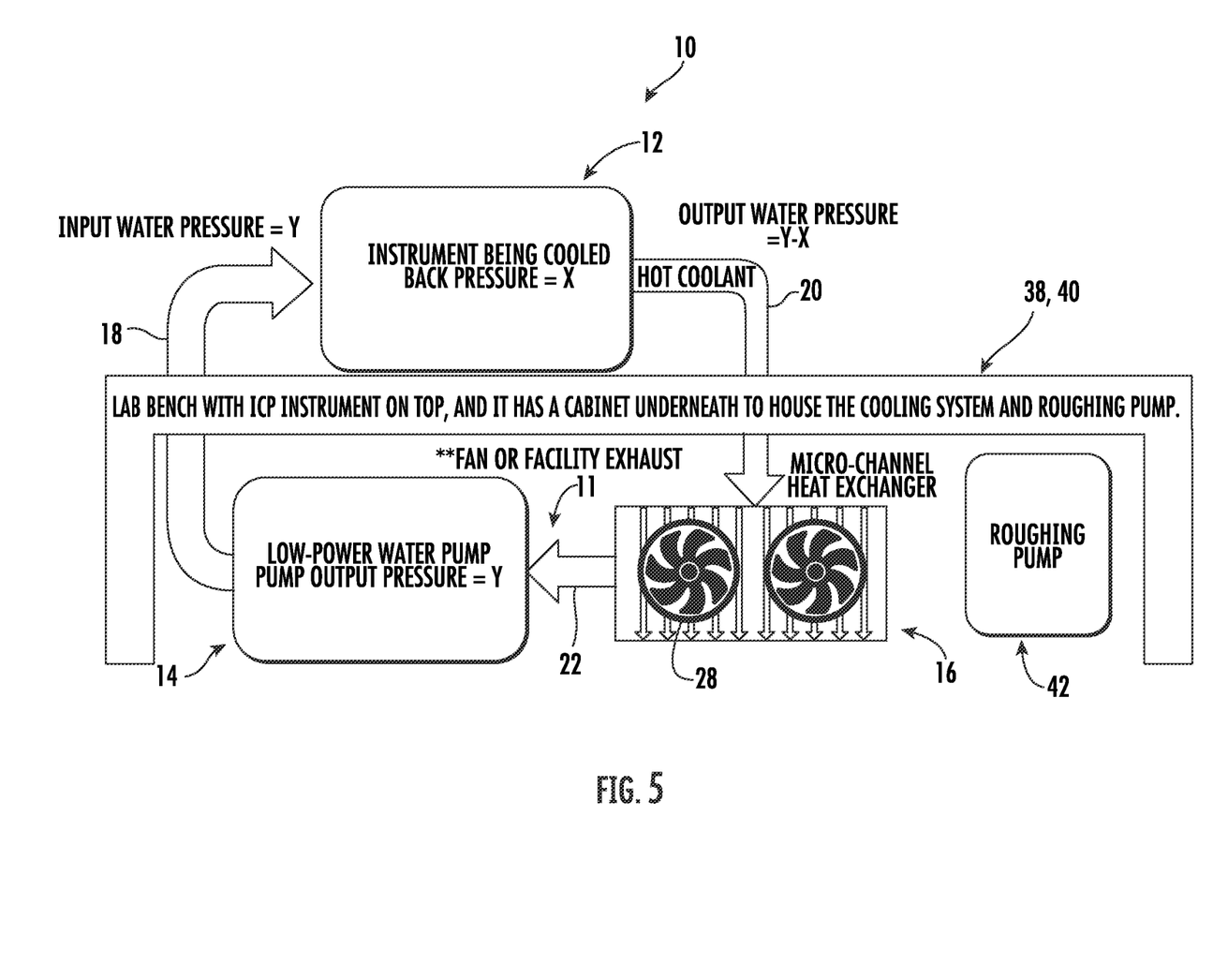
FIG. 5 is a schematic diagram of a system for cooling an ICP instrument according to some other embodiments.

Referring to FIG. 5, in some embodiments, the instrument 12 may be on a bench 38 such as a lab bench and at least a portion of the cooling system 11 may be positioned under the lab bench 38. There may be a cabinet or housing 40 that houses at least a portion of the cooling system 11. For example, as illustrated, the pump 14, the heat exchanger 16, the fan 28 (where used), a portion of the first conduit 18, a portion of the second conduit 20, and the third conduit 22 may be below the bench 38 and/or in the housing 40. In some embodiments, a roughing pump 42 may also be below the bench 38 and/or in the housing 40. As understood by those skilled in the art, the roughing pump 42 generates the primary vacuum for the system. The cooling system 11 under the bench 38 and/or enclosed in the housing 40 may include the "smart cooling" features described above with reference to FIG. 3.

Figure 6:
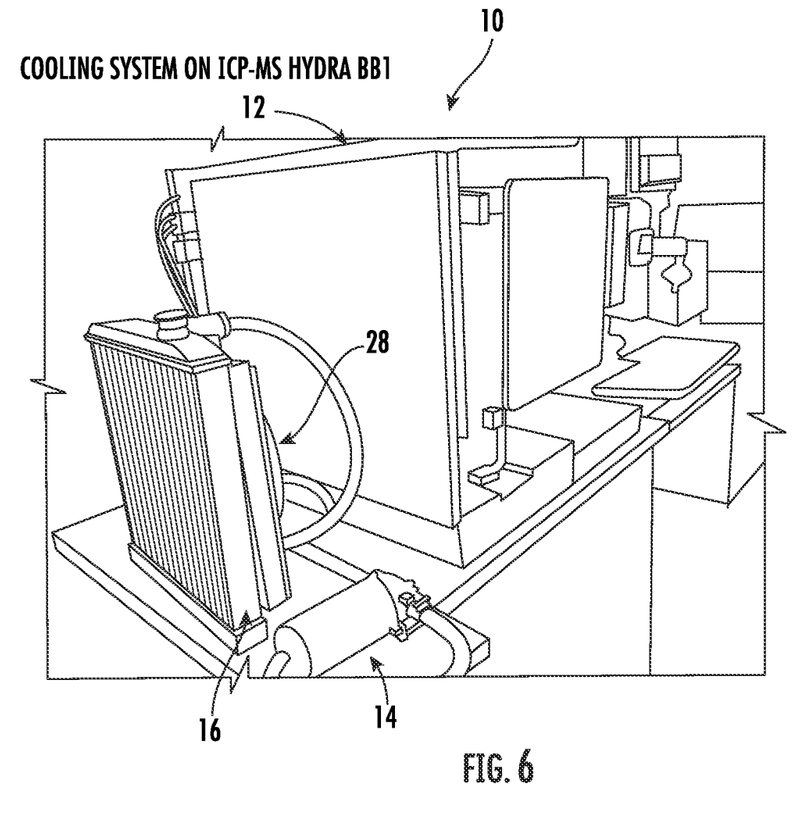
FIG. 6 is a perspective view of an experimental setup of a system for cooling an ICP instrument according to some embodiments.
Figure 7A:
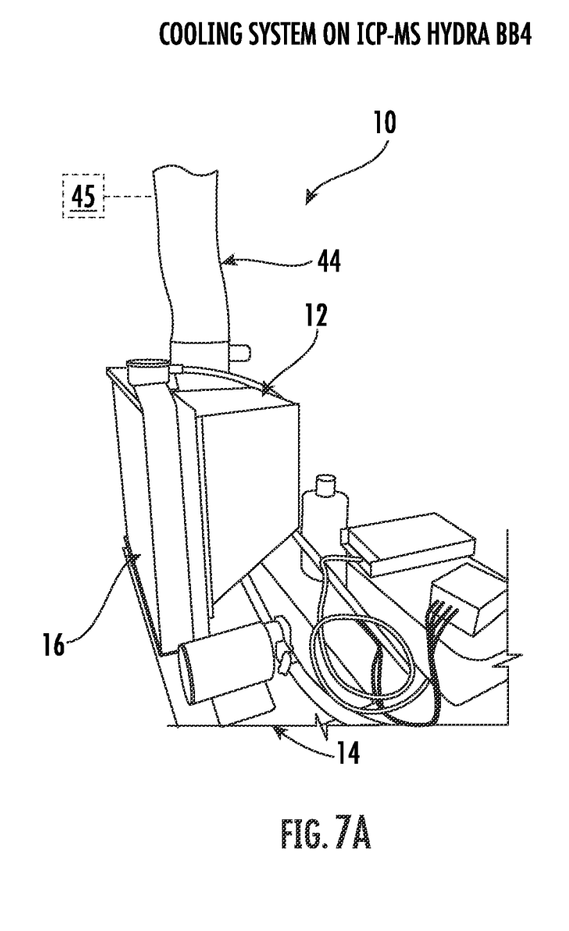
FIG. 7A is a perspective view of an experimental setup of a system for cooling an ICP instrument according to some other embodiments.
Figure 7B:
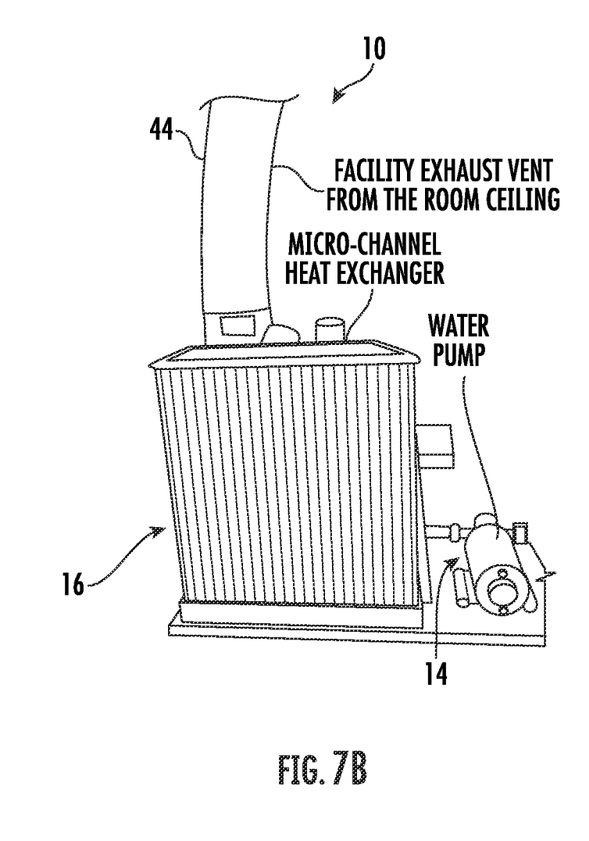
FIG. 7B is another perspective view of the experimental setup of FIG. 7A.

FIGS. 6, 7A, and 7B illustrate experimental setups that use the cooling solutions as described herein and have demonstrated similar cooling capabilities to the baseline chiller solution. FIG. 3 shows the cooling system 11 used with an ICP-MS instrument 12. The cooling system 11 includes a water pump 14 (e.g., a 12V DC pump), a micro-channel heat exchanger 16, and a fan 28 (e.g., a 12V DC fan).

FIGS. 7A and 7B show the cooling system 11 used with an ICP-MS instrument 12. The cooling system 11 includes a water pump 14 (e.g., a 12V DC pump) and a micro-channel heat exchanger 16. In this embodiment, the cooling fan is omitted and replaced by an exhaust vent 44 that provides air suction (e.g., as part of the laboratory or building facility) to enable air flow via the heat exchanger fins for air cooling. This may be a lower cost solution as the fan and DC fan power supply are eliminated. This may also be a quieter solution because there is no fan noise.

The venting of the heat may be adjusted to route it to the ambient air in the interior room in colder months, or to the outside via the facility exhaust in warmer months. This will reduce the heating cost of the building in cold seasons.

Figure 8:
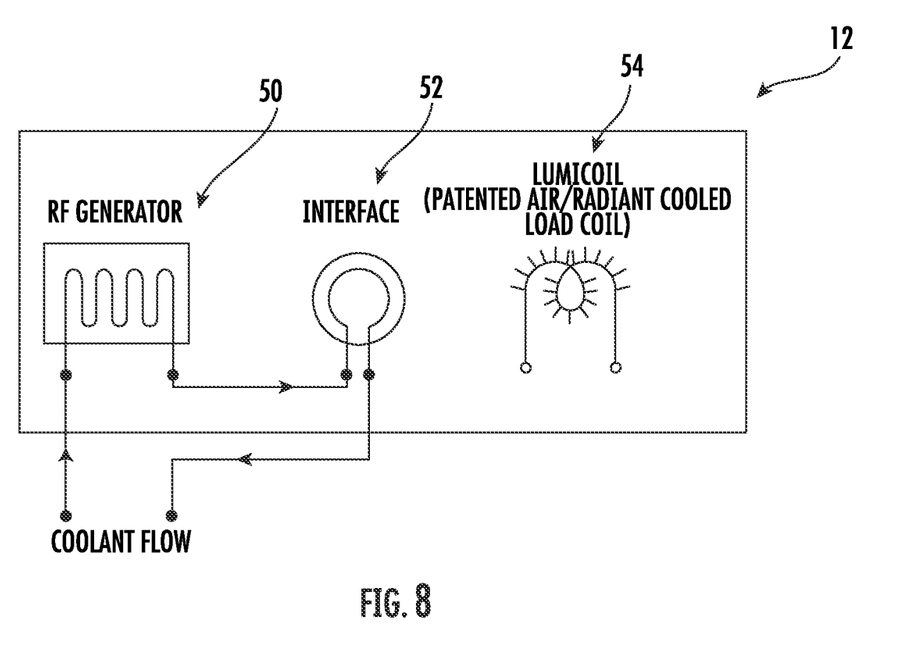
FIG. 8 is a schematic diagram of an ICP instrument according to some embodiments.

FIG. 8 is a schematic diagram of the ICP instrument 12 illustrating some system components that are typically cooled with a coolant. An ICP-MS (or other analytical instrument) system using liquid cooling should deal with the effects of coolant flow resistance (often called "back pressure"). In order to enable the use of a lower power consumption, high efficiency cooling system, an instrument with low flow resistance (i.e., low "back pressure" at the required coolant flow rate) is required.

For ICP-MS, the following key system components require cooling: an RF power generator 50 that supplies power to a plasma torch via an RF load coil; an atmosphere to vacuum interface 52 for mass spectrometer; and an RF load coil 54 that transfers RF power from the RF generator to the argon plasma. Sometimes other components also require cooling, e.g., turbomolecular vacuum pump.

In the case of commercial ICP-MS systems, liquid-cooled RF coils are typically employed. Therefore, the liquid coolant may be circulated through three major components of the system of which the RF load coil has a high flow restriction due to its necessarily small mechanical size.

However, as described in U.S. Pat. No. 10,462,890, the disclosure of which is incorporated by reference in its entirety, an RF load coil (also referred to herein as a "LumiCoil") does not require liquid cooling and may be cooled without making contact with a coolant. Therefore, as shown in FIG. 8, the load coil is removed from the coolant flow circuit, resulting in a significant reduction in flow resistance, which in turn enables the use of a smaller, lower pressure, more energy-efficient coolant circulating pump (such as the pump 14 described herein).

Furthermore, in a typical ICP-MS instrument, the maximum heat load (due to plasma source operation) removed by the cooling system is approximately 2000 watts in total, distributed as follows: 500 watts from the RF generator; 1000 watts from the atmosphere to vacuum interface; and 500 watts from the RF load coil.

However, according to some embodiments, since the RF load coil is not part of the liquid cooling circuit, the overall heat load removed by the liquid cooling system is reduced by approximately 25% (500 watts at maximum plasma power). This reduced cooling requirement enables the use of a smaller and more energy-efficient cooling system (such as the system described herein), which would be inadequate for conventional ICP-MS instrument designs of compatible plasma power.

Figure 9:
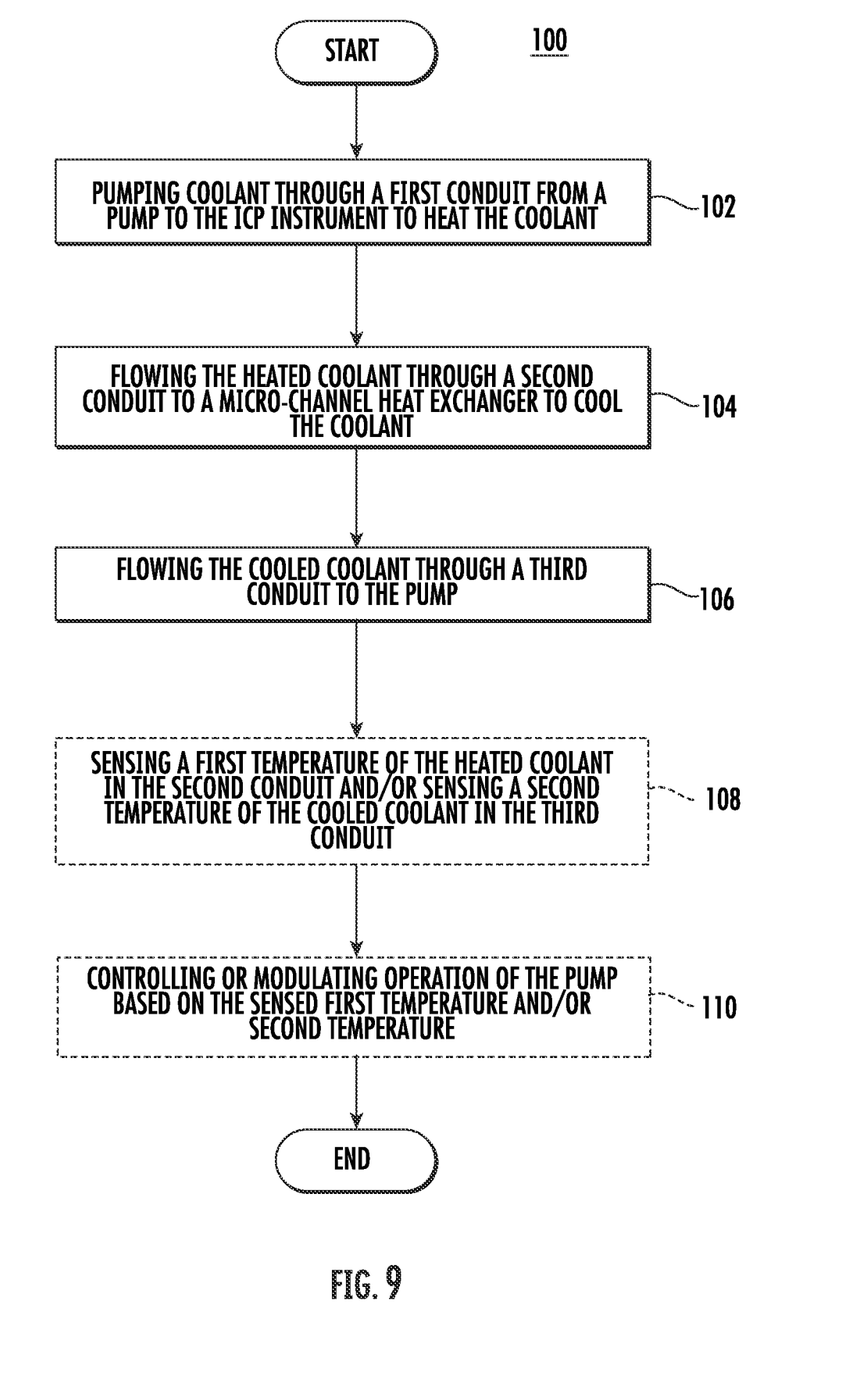
FIG. 9 is a flowchart illustrating methods according to some embodiments.

Referring to FIG. 9, some embodiments relate to a method 100 for cooling an ICP instrument. Referring to FIGS. 1-9, the method may include pumping coolant through a first conduit 18 from a pump 14 to the ICP instrument 12 to heat the coolant (Block 102 in FIG. 9). The method may include flowing the heated coolant through a second conduit 20 to a micro-channel heat exchanger 16 to cool the coolant (Block 104). The method may include flowing the cooled coolant through a third conduit 22 to the pump 14 (Block 106). An outlet pressure of the pump 14 may exceed a back pressure of the instrument 12 such that a pressure of the heated coolant flowing through the second conduit 20 to the micro-channel heat exchanger 16 is less than or equal to 5 psi above atmospheric pressure, as measured at an inlet 17 to the heat exchanger 16.

In some embodiments, the method 100 may include sensing a first temperature of the heated coolant in the second conduit 20 and/or sensing a second temperature of the cooled coolant in the third conduit 22 (Block 108). The method may include controlling or modulating operation of the pump 14 based on the sensed first temperature and/or second temperature (Block 110). In some embodiments, the controlling or modulating operation of the pump 14 based on the sensed first temperature and/or second temperature may be to stabilize an internal temperature of the instrument 12 and/or to stabilize a temperature of the coolant exiting the instrument 12. In some embodiments, the controlling or modulating operation of the pump 14 based on the sensed first temperature and/or second temperature may be to accelerate a warmup period of the instrument 12.

Figure 10:
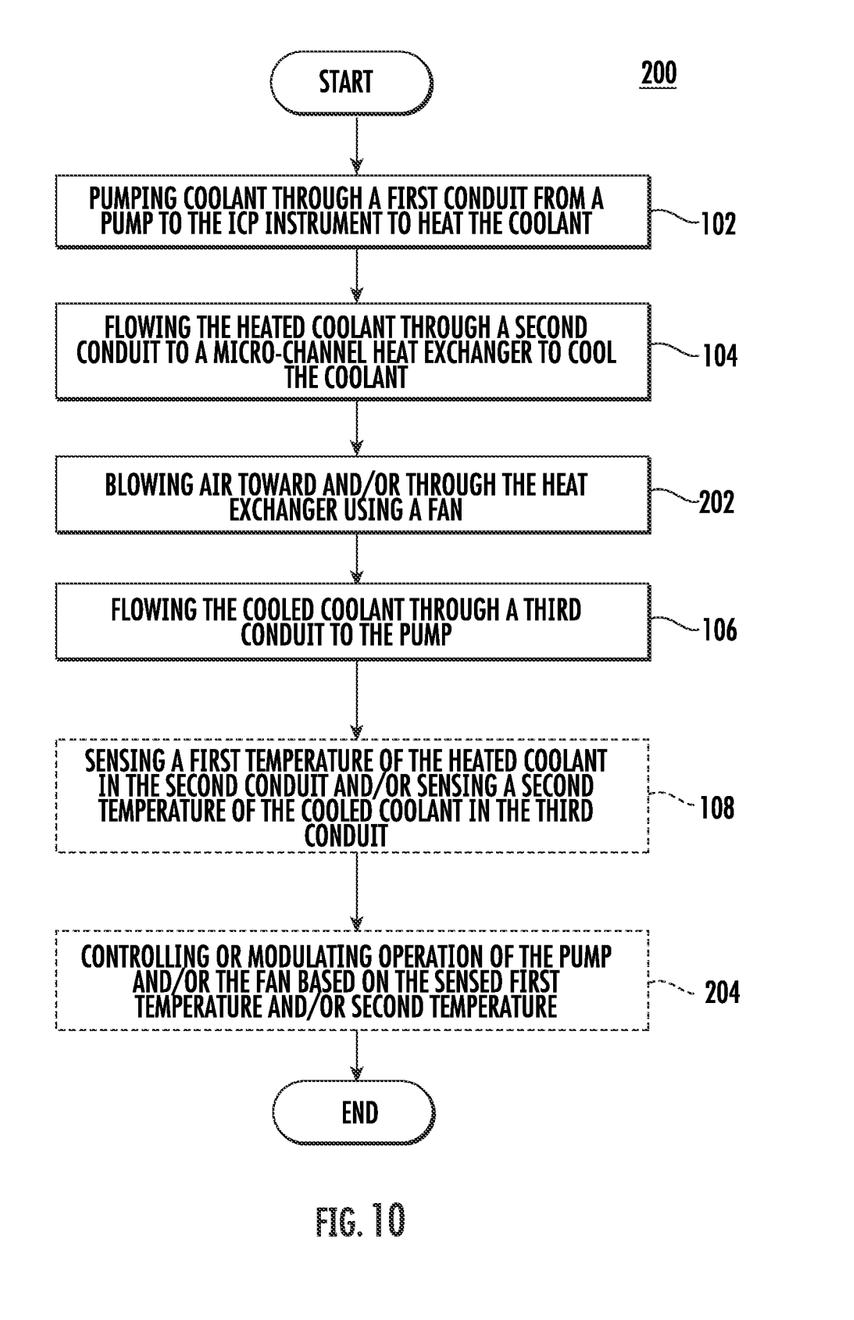
FIG. 10 is a flowchart illustrating methods according to some embodiments.

Referring to FIG. 10, some embodiments relate to a method 200 for cooling an ICP instrument. Referring to FIGS. 1-8 and 10, the method may include pumping coolant through a first conduit 18 from a pump 14 to the ICP instrument 12 to heat the coolant (Block 102 in FIG. 10). The method may include flowing the heated coolant through a second conduit 20 to a micro-channel heat exchanger 16 to cool the coolant (Block 104). The method may include blowing air toward and/or through the heat exchanger 16 using a fan 28 (Block 202). The method may include flowing the cooled coolant through a third conduit 22 to the pump 14 (Block 106). An outlet pressure of the pump 14 may exceed a back pressure of the instrument 12 such that a pressure of the heated coolant flowing through the second conduit 20 to the micro-channel heat exchanger 16 is less than or equal to 5 psi above atmospheric pressure, as measured at an inlet 17 to the heat exchanger 16.

In some embodiments, the method 200 may include sensing a first temperature of the heated coolant in the second conduit 20 and/or sensing a second temperature of the cooled coolant in the third conduit 22 (Block 108). The method may include controlling or modulating operation of the pump 14 and/or the fan 28 based on the sensed first temperature and/or second temperature (Block 204). In some embodiments, the controlling or modulating operation of the pump 14 and/or the fan 28 based on the sensed first temperature and/or second temperature may be to stabilize an internal temperature of the instrument 12 and/or to stabilize a temperature of the coolant exiting the instrument 12. In some embodiments, the controlling or modulating operation of the pump 14 and/or the fan 28 based on the sensed first temperature and/or second temperature may be to accelerate a warmup period of the instrument.

Figure 11:
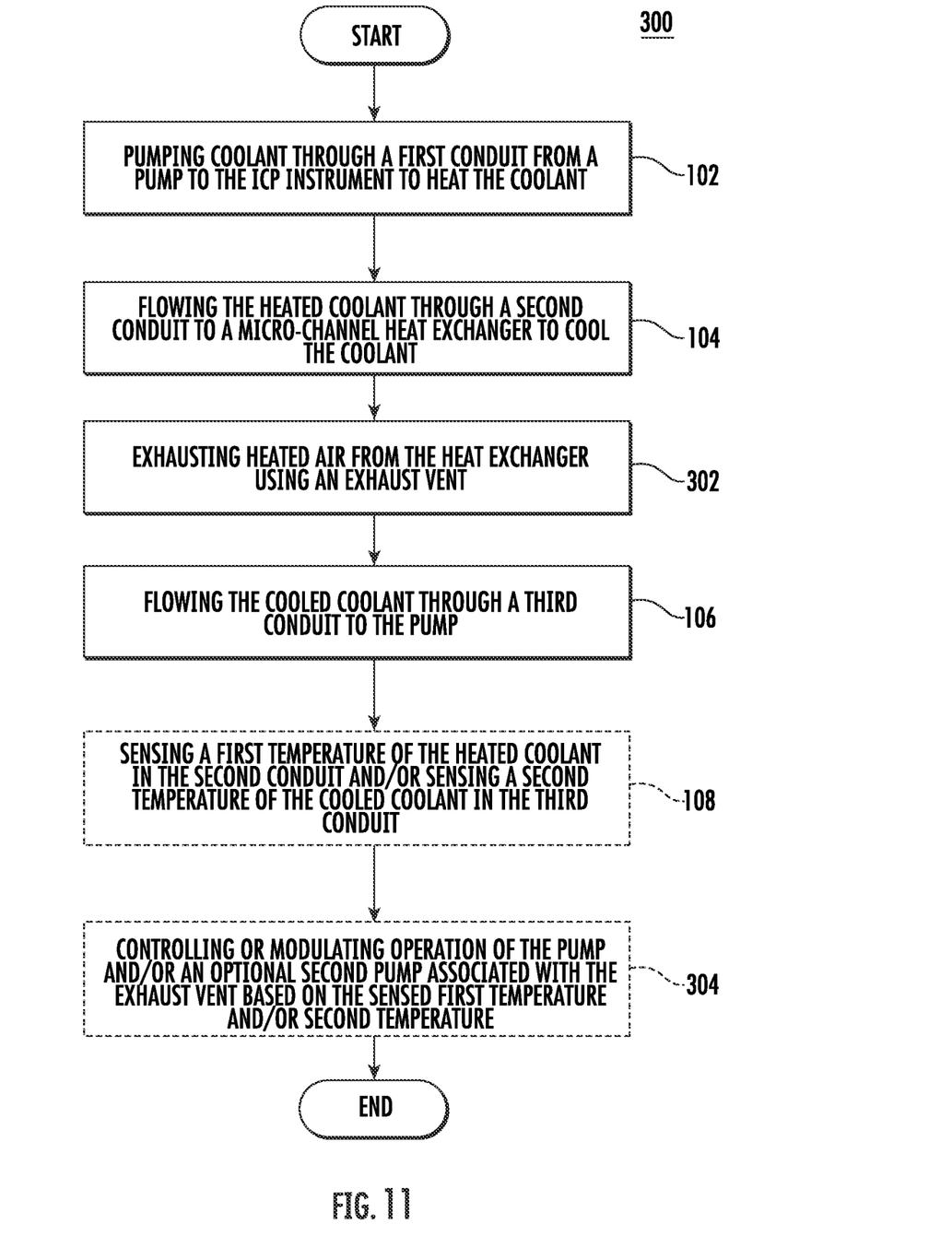
FIG. 11 is a flowchart illustrating methods according to some embodiments.

Referring to FIG. 11, some embodiments relate to a method 300 for cooling an ICP instrument. Referring to FIGS. 1-8 and 11, the method may include pumping coolant through a first conduit 18 from a pump 14 to the ICP instrument 12 to heat the coolant (Block 102 in FIG. 11). The method may include flowing the heated coolant through a second conduit 20 to a micro-channel heat exchanger 16 to cool the coolant (Block 104). The method may include exhausting heated air from the heat exchanger 16 using an exhaust vent 44 (Block 302). The method may include flowing the cooled coolant through a third conduit 22 to the pump 14 (Block 106). An outlet pressure of the pump 14 may exceed a back pressure of the instrument 12 such that a pressure of the heated coolant flowing through the second conduit 20 to the micro-channel heat exchanger 16 is less than or equal to 5 psi above atmospheric pressure, as measured at an inlet 17 to the heat exchanger 16.

In some embodiments, the method 300 may include sensing a first temperature of the heated coolant in the second conduit 20 and/or sensing a second temperature of the cooled coolant in the third conduit 22 (Block 108). The method may include controlling or modulating operation of the pump 14 and/or an optional (second) pump 45 associated with the exhaust vent 44 (FIG. 7A) based on the sensed first temperature and/or second temperature (Block 304). In some embodiments, the controlling or modulating operation of the (first) pump 14 and/or an optional (second) pump 45 associated with the exhaust vent 44 based on the sensed first temperature and/or second temperature may be to stabilize an internal temperature of the instrument 12 and/or to stabilize a temperature of the coolant exiting the instrument 12. In some embodiments, the controlling or modulating operation of the (first) pump 14 and/or an optional (second) pump 45 associated with the exhaust vent 44 based on the sensed first temperature and/or second temperature may be to accelerate a warmup period of the instrument.

The present technology has been described herein with reference to the accompanying drawings, in which illustrative embodiments of the technology are shown. In the drawings, the relative sizes of regions or features may be exaggerated for clarity. This technology may, however, be embodied in many different forms and should not be construed as limited to the embodiments set forth herein; rather, these embodiments are provided so that this disclosure will be thorough and complete, and will fully convey the scope of the technology to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present technology.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items. When the term "about" or "substantially equal to" is used in the specification the intended meaning is that the value is plus or minus 5% of the specified value.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present technology are explained in detail in the specification set forth herein.

Unless otherwise defined, all terms (including technical and scientific terms) used herein have the same meaning as commonly understood by one of ordinary skill in the art to which this technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The foregoing is illustrative of the present technology and is not to be construed as limiting thereof. Although a few example embodiments of this technology have been described, those skilled in the art will readily appreciate that many modifications are possible in the example embodiments without materially departing from the teachings and advantages of this technology. Accordingly, all such modifications are intended to be included within the scope of this technology as defined in the claims. The technology is defined by the following claims, with equivalents of the claims to be included therein.

What is claimed is:

1. A system for cooling an inductively coupled plasma (ICP) instrument, the system comprising:
   the ICP instrument;
   a pump in fluid communication with the instrument via a first conduit; and
   a micro-channel heat exchanger in fluid communication with the instrument via a second conduit, and in fluid communication with the pump via a third conduit,
   wherein the pump is configured to generate a pump outlet pressure of coolant that exceeds a back pressure of the instrument such that a pressure of the coolant traveling through the second conduit and into the heat exchanger is less than or equal to 5 pounds per square inch (psi) above atmospheric pressure, as measured at an inlet to the heat exchanger.

2. The system of claim 1 further comprising:
   a fan configured to blow air for air cooling of the heat exchanger; and
   a controller operatively associated with the pump and/or the fan,
   wherein the controller is configured to control or modulate operation of the pump and/or the fan to stabilize an internal temperature of the instrument and/or to stabilize a temperature of the coolant exiting the instrument.

3. The system of claim 2 further comprising at least one temperature sensor in the second conduit and/or in the third conduit, the at least one temperature sensor configured to provide feedback to the controller.

4. The system of claim 1 further comprising an exhaust vent configured to provide air suction for air cooling of the heat exchanger.

5. The system of claim 4 further comprising a controller operatively associated with the pump, wherein the controller is configured to control or modulate operation of the pump to stabilize an internal temperature of the instrument and/or to stabilize a temperature of the coolant exiting the instrument.

6. The system of claim 5 further comprising at least one temperature sensor in the second conduit and/or in the third conduit, the at least one temperature sensor configured to provide feedback to the controller.

7. The system of claim 4 wherein the exhaust vent is adjustable such that an outlet of the exhaust vent can be selectively positioned to provide heated air to a room in which the system is positioned or to vent heated air to outside the room.

8. The system of claim 1 further comprising a housing, wherein the instrument, the pump, the heat exchanger, the first conduit, the second conduit, and the third conduit are all held in the housing.

9. The system of claim 1 further comprising a housing, wherein the pump, the heat exchanger, at least a portion of the first conduit, at least a portion of the second conduit, and the third conduit held in the housing, and wherein the instrument is outside the housing and optionally on the housing.

10. The system of claim 1 wherein the pump has a power consumption of 180 watts or less.

11. The system of claim 1 wherein the pump is configured to generate the pump outlet pressure of the coolant such that the coolant traveling through the second conduit and into the heat exchanger is less than or equal to atmospheric pressure, as measured at the inlet to the heat exchanger.

12. The system of claim 1 wherein the ICP instrument is an ICP-mass spectrometry (ICP-MS) or ICP-optical emission spectrometry (ICP-OES) instrument.

13. The system of claim 1 wherein the ICP instrument comprises an RF load coil that is not cooled by contact with the coolant.

14. The system of claim 1 wherein the ICP instrument comprises an RF load coil that is air cooled.

15. A method for cooling an inductively coupled plasma (ICP) instrument, the method comprising:
pumping coolant through a first conduit from a pump to the ICP instrument to heat the coolant;
flowing the heated coolant through a second conduit to a micro-channel heat exchanger to cool the coolant; and
flowing the cooled coolant through a third conduit to the pump,
wherein an outlet pressure of the pump exceeds a back pressure of the instrument such that a pressure of the heated coolant flowing through the second conduit to the micro-channel heat exchanger is less than or equal to 5 psi above atmospheric pressure, as measured at an inlet to the heat exchanger.

16. The method of claim 15 further comprising:
sensing a first temperature of the heated coolant in the second conduit and/or sensing a second temperature of the cooled coolant in the third conduit; and
controlling or modulating operation of the pump based on the sensed first temperature and/or second temperature to stabilize an internal temperature of the instrument and/or to stabilize a temperature of the coolant exiting the instrument.

17. The method of claim 15 further comprising:
sensing a first temperature of the heated coolant in the second conduit and/or sensing a second temperature of the cooled coolant in the third conduit; and
controlling or modulating operation of the pump based on the sensed first temperature and/or second temperature to accelerate a warmup period of the instrument.

18. The method of claim 15 further comprising blowing air toward and/or through the heat exchanger using a fan.

19. The method of claim 18 further comprising:
sensing a first temperature of the heated coolant in the second conduit and/or sensing a second temperature of the cooled coolant in the third conduit; and
controlling or modulating operation of the pump and/or the fan based on the sensed first temperature and/or second temperature to stabilize an internal temperature of the instrument and/or to stabilize a temperature of the coolant exiting the instrument.

20. The method of claim 18 further comprising:
sensing a first temperature of the heated coolant in the second conduit and/or sensing a second temperature of the cooled coolant in the third conduit; and
controlling or modulating operation of the pump and/or the fan based on the sensed first temperature and/or second temperature to accelerate a warmup period of the instrument.

21. The method of claim 15 further comprising exhausting heated air from the heat exchanger using an exhaust vent.

22. The method of claim 21 further comprising:
sensing a first temperature of the heated coolant in the second conduit and/or sensing a second temperature of the cooled coolant in the third conduit; and
controlling or modulating operation of the pump and/or an optional second pump associated with the exhaust vent based on the sensed first temperature and/or second temperature to stabilize an internal temperature of the instrument and/or to stabilize a temperature of the coolant exiting the instrument.

23. The method of claim 21 further comprising:
sensing a first temperature of the heated coolant in the second conduit and/or sensing a second temperature of the cooled coolant in the third conduit; and
controlling or modulating operation of the pump and/or an optional second pump associated with the exhaust vent based on the sensed first temperature and/or second temperature to accelerate a warmup period of the instrument.

24. The method of claim 21 further comprising selectively routing the heated air to a room in which the instrument is located to heat the room or to outside the room.

25. The method of claim 15 wherein the outlet pressure of the pump exceeds the back pressure of the instrument such that the pressure of the heated coolant flowing through the second conduit to the micro-channel heat exchanger is less than or equal to atmospheric pressure.

26. A cooling system for an inductively coupled plasma ICP instrument, the system comprising:
a pump in fluid communication with the instrument via a first conduit; and
a micro-channel heat exchanger in fluid communication with the instrument via a second conduit, and in fluid communication with the pump via a third conduit,
wherein the pump is configured to generate a pump outlet pressure of coolant that exceeds a back pressure of the instrument such that a pressure of the coolant traveling through the second conduit and into the heat exchanger is less than or equal to 5 psi above atmospheric pressure, as measured at an inlet to the heat exchanger.

* * * * *